Oct. 19, 1937.                J. KATZMAN                2,096,673
                         ELECTROLYTIC CONDENSER
                           Filed May 31, 1934
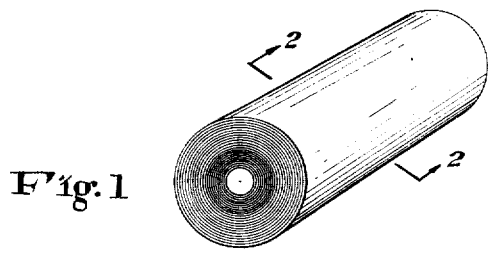
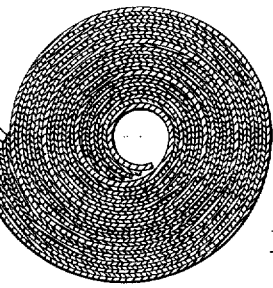
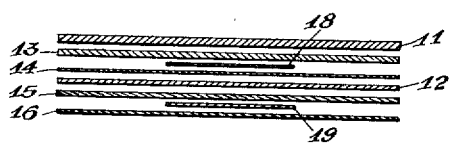
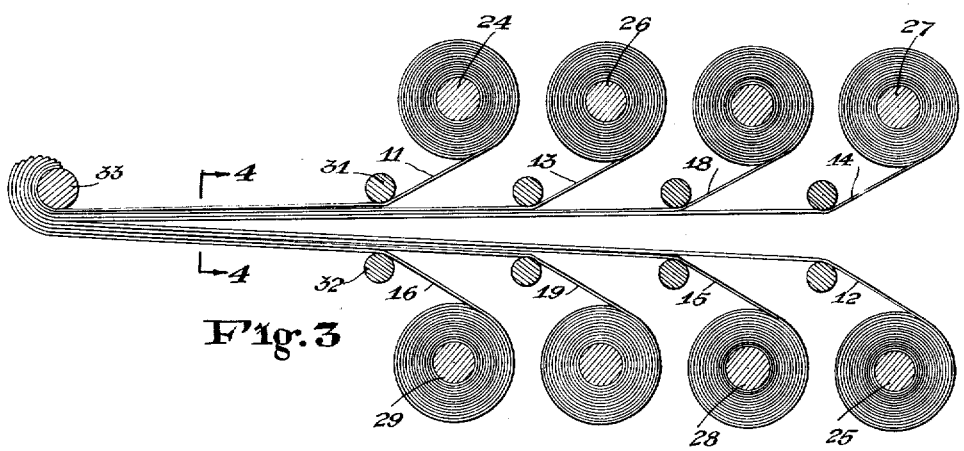
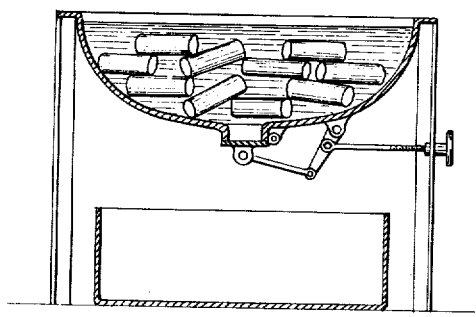
INVENTOR
JACOB KATZMAN
BY
ATTORNEY Patented Oct. 19, 1937

2,096,673

UNITED STATES PATENT OFFICE 2,096,673

ELECTROLYTIC CONDENSER

Jacob Katzman, Brooklyn, N. Y., assignor to Nova Electric Corporation, New York, N. Y., a corporation of New York Application May 31, 1934, Serial No. 728,273

7 Claims. (Cl. 175—315)

My invention relates to a novel electrolytic condenser and novel methods of making the same, and more particularly relates to a novel electrolyte for an electrolytic condenser and a novel construction of the condenser.

The qualities sought for in an electrolyte are: a relatively high breakdown voltage; a non-corrosive action on the foil or plates; a higher stable dielectric film; and a cheap and simple manufacture thereof.

Accordingly an object of my invention is to provide a novel electrolyte having these properties for an electrolytic condenser.

In the manufacture of dry electrolytic condensers the foils, usually aluminum, are first preformed. This consists in coating the aluminum foil with an oxide in an electrolytic bath.

The pre-formed foil and its spacers, impregnated with a suitable electrolyte, are then rolled together in the manner well known in the art. Some of the oxide coating is lost in this step by dissolving in the electrolyte, but when a current is passed through the condenser for final forming, the oxide coating is reformed with the loss, however, of some of the electrolyte. Unless there was sufficient electrolyte, the loss may result in a dry condenser with no electrolyte and therefore considerable loss of capacity.

In order that there be sufficient electrolyte impregnated in the fabric to leave sufficient electrolyte, after a loss of a portion thereof in the above step, it has heretofore been thought essential to first impregnate and then roll the condenser—a time-consuming, clumsy, and costly procedure. Heretofore attempts to first roll and then impregnate the condenser have not been entirely satisfactory, particularly for condensers using two layers of different texture between the electrodes, one for spacing and a more porous one for absorbing the electrolyte. In these cases, it is usually the practice to employ two layers of paper of different thickness and texture.

I have discovered that when such a condenser is first rolled and then dipped into an electrolytic bath, the outer edges of absorbent paper which first comes into contact with the electrolyte absorbs a considerable quantity of electrolyte, this in fact being a desired property of paper.

But as it absorbs the electrolyte, it swells at the edges so that adjacent turns of paper, normally separated slightly, fill this space and engage with each other, thus sealing the condenser at the edges and preventing the electrolyte from freely seeping into the interior portion of the condenser to impregnate that portion. Accordingly, the interior surface receives only a relatively small amount of electrolyte, most of which is lost when re-forming of the electrode occurs.

Accordingly, it is a further object of my invention to provide simple, cheap and novel methods of and means for effectively manufacturing the condenser.

A further object of my invention is to provide novel methods of and means for thoroughly impregnating the condenser.

Still a further object is to provide means for preventing the edges of the condenser from swelling to seal against thorough impregnation.

There are other objects of my invention which together with the foregoing will appear in the detailed description which is to follow in connection with the drawing in which:

Figure 1 is a perspective view of the condenser;

Figure 2 is a cross section of several turns of the condenser;

Figure 3 is a schematic view of a method of rolling the condenser;

Figure 4 is a cross section of the condenser in undeveloped form; and

Figure 5 is a cross section of a tank used in manufacturing my wet electrolytic condenser employing my novel electrolyte.

I have discovered that a solution comprising sixty parts of an alcohol such as glycerin or ethylene glycol, when mixed with a citrate such as citric acid or ammonium citrate or a combination of such nitrates and boiled, will combine to produce an electrolyte having the desirable properties of an electrolyte described above. Preferably the proportions of the alcohol and the citrate are in the ratio by weight of sixty to forty respectively. This mixture is then boiled until all the citric acid has been taken up by the glycerin to produce a chemical reaction, forming a glycerol or glycol citrate. The ratio of glycerin to the citric acid may vary from 90 parts by weight of glycerin to 10 parts of citric acid to 10 parts by weight of glycerin for relatively low voltage condensers (150 v.) to 90 parts of citric acid for high voltage condensers (500 v.).

The electrolyte may be used to impregnate the electrolytic condensers of the so-called dry type as is done at present with the other electrolytes, or the electrolytes may be used in the wet electrolytic condenser.

When used in the wet electrolytic condenser, it may be advisable to thin the solution by changing the ratio of the glycol with respect to the citrate, that is, by using a large percentage of glycol, either by increasing the amount of glycol or decreasing the amount of citrate.

Distilled water may be added to produce an electrolyte for the so-called wet electrolytic condenser. The amount of water to be added may be varied widely depending upon the shape of the positive plate (or the closeness of convolutions; i. e., space available between surfaces of positive plates) for permitting gases to escape. This will be explained in more detail hereinafter in connection with the description of Figure 5.

Referring to the drawing, the condenser comprises the two metal foils 11 and 12 of positive and negative polarity, separated by the two layers 13 and 14 appearing between foils 11 and 12 and 15 and 16 appearing between foils 12 and 11 when rolled up. The spacers 13 and 14 are of different textural structure, one acting to space and the other to absorb the electrolyte as described in my copending application Ser. No. 684,164, filed August 8, 1933. Interposed between the spacers 13 and 14, and 15 and 16, I place thin and narrow tape of strips of material 18 and 19 which function to separate the spacers 13 and 14, and 15 and 16.

When now the condenser is dipped into the electrolyte as described hereinafter, for impregnation after it has been rolled into shape, the electrolyte will be absorbed by the absorbent paper spacers and will swell them in the manner described hereinbefore. However, due to the fact that the spacers 13 and 14, and 15 and 16 are separated from each other by the strips 18 and 19, as clearly shown in Figure 4, they will not, when so swelled, completely seal the condenser, but will leave a space which will permit a free flow of the electrolyte into the interior spaces of the condenser, thus thoroughly impregnating all parts of the condenser.

With this construction of the condenser, I may now manufacture the condenser in a substantially automatic method, reducing the cost of manufacture as well as resulting in a better construction thereof.

In accordance with my novel method of manufacture, I first place the mixture of an alcohol such as glycerin and citrate in an open aluminum pot and heat to a boiling point at a temperature of approximately 250°. The boiling continues until all the citric acid has gone into and been taken up by the glycerin. Thereafter boiling is continued for approximately ten minutes. The electrolyte is now ready for use.

The condensers have in the meanwhile been rolled into shape on a mandril as shown in Figure 3. The foils 11 and 12, of construction shown in my copending application referred to above, are mounted on rolls 24 and 25. The papers 13, 14, 15 and 16, also mounted on rolls 26, 27, 28 and 29, respectively, are brought together over the rollers 31 and 32, and then to the mandril 33. This is geared so that a predetermined number of revolutions of the mandril will roll together an amount of foil and paper to form a condenser of a predetermined capacity.

The sheets 11 to 16 are then cut and the ends again brought around the mandril for rolling the next condenser. The previously rolled condenser, with the leads formed as described in my previous application, are now temporarily held in rolled shape as by a rubber band.

The condensers thus rolled are placed in the vat containing the boiling electrolyte described above. While boiling continues, the rolled condensers are left in the electrolyte for a period of approximately one half hour. The electrolyte is then allowed to cool to about 20° above room temperature. The contraction of the solution during cooling assists in completely impregnating the condensers.

The electrolyte and condensers are then poured into the tray shown in Figure 5, having a drain pipe extending from the bottom, permitting excess electrolyte to drain off to be recovered in a receiving container, and the condensers are completed, ready for testing and packaging.

Although I have disclosed a preferred electrolyte, construction of condenser and manufacture thereof, it will be obvious that these may be varied without departing from the spirit of my invention and I do not intend to be limited except as set forth in the appended claims.

I claim:

1. An electrolytic condenser comprising a positive and negative foil; spacers between the foils; and a relatively narrow tape separating the spacers.

2. An electrolytic condenser comprising a positive and negative foil; a layer of paper between the foils for absorbing the electrolyte; a second layer of paper spacer between the foils; and a relatively narrow strip of material at the center and between the paper layers for spacing the same.

3. An electrolytic condenser comprising a positive and negative foil; a layer of a predetermined structure between the foils for absorbing the electrolyte; a second layer of a different structure between the foils; and a relatively narrow strip of material at the center and between the layers for spacing the same.

4. An electrolytic condenser comprising two electrodes; electrolyte absorbing means between said electrodes; and separating means for maintaining substantially narrower than said absorbing means the surface of said absorbing means facing said separating means exposed for thorough impregnation by the electrolyte.

5. An electrolytic condenser comprising two electrodes; electrolyte absorbing layers between said electrodes; and means for maintaining the surface adjacent the outer edges of said absorbing layers and facing said means exposed for thorough impregnation by the electrolyte comprising a relatively narrow spacer interposed between said absorbing layers.

6. An electrolytic condenser comprising positive and negative foil electrodes; electrolyte absorbing means between said electrodes, said means and electrodes being coiled into a roll; and separating means for maintaining the surface of said absorbing means facing said separating means exposed for thorough impregnation by the electrolyte.

7. An electrolytic condenser comprising positive and negative foil electrodes; electrolyte absorbing layers between said electrodes, said layers and electrodes being coiled into a roll; and means for maintaining substantially the entire surface of the layers which face said means exposed for thorough impregnation by the electrolyte comprising a relatively narrow spacer coiled between said layers.

JACOB KATZMAN.

CERTIFICATE OF CORRECTION.

Patent No. 2,096,673.  October 19, 1937.

JACOB KATZMAN.

It is hereby certified that error appears in the printed specification of the above numbered patent requiring correction as follows: Page 1, second column, line 33, for the word "nitrates" read citrates; page 2, second column, line 42-43, claim 4, strike out the words "for maintaining" and insert the same after "means" first occurrence, line 44; and that the said Letters Patent should be read with these corrections therein that the same may conform to the record of the case in the Patent Office.

Signed and sealed this 1st day of February, A. D. 1938.

(Seal)

Henry Van Arsdale,
Acting, Commissioner of Patents.